No. 614,875. Patented Nov. 29, 1898.
H. W. LIBBEY.
TROLLEY FOR ELECTRIC CARS.
(Application filed Jan. 11, 1898.)
(No Model.)

Witnesses.
Inventor.
Hosea W. Libbey
by Edwin Plant
attorney.

UNITED STATES PATENT OFFICE.

HOSEA W. LIBBEY, OF BOSTON, MASSACHUSETTS.

TROLLEY FOR ELECTRIC CARS.

SPECIFICATION forming part of Letters Patent No. 614,875, dated November 29, 1898.

Application filed January 11, 1898. Serial No. 666,306. (No model.)

*To all whom it may concern:*

Be it known that I, HOSEA W. LIBBEY, a citizen of the United States, and a resident of Boston, in the county of Suffolk and State of Massachusetts, have invented certain new and useful Improvements in Trolleys for Electric Cars, of which the following, taken in connection with the accompanying drawings, is a specification.

The object of my invention is to construct a trolley for electric cars so that should the trolley at any time become out of contact with the electric wire or conductor said electric wire will be caught by an auxiliary contact trolley or roller, so that the circuit will not be broken and the car come to a standstill.

The invention consists in mounting on each side of the main trolley-wheel an auxiliary wheel or roller, which is carried by the same axle as the main trolley-wheel, the said axle being at its outer ends supported in brackets extending from the sides of the main trolley-wheel truck, so that should the main trolley-wheel be thrown out of contact with the electric wire or conductor by the jolting of the car or other cause one of the auxiliary wheels will come into contact with the electric wire or conductor, and thus the electric current will be supplied, through said auxiliary wheel, to the car, and it will proceed on its journey without interruption.

Figure 1:
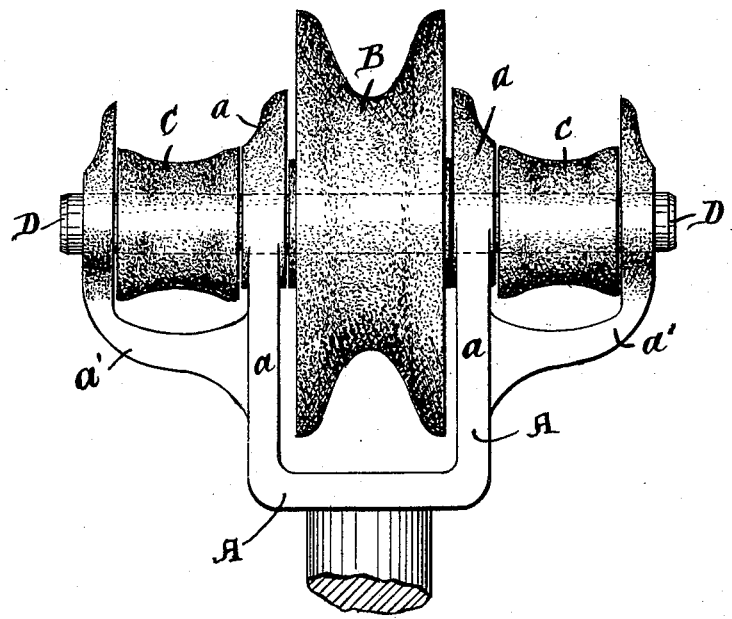
Figure 2:
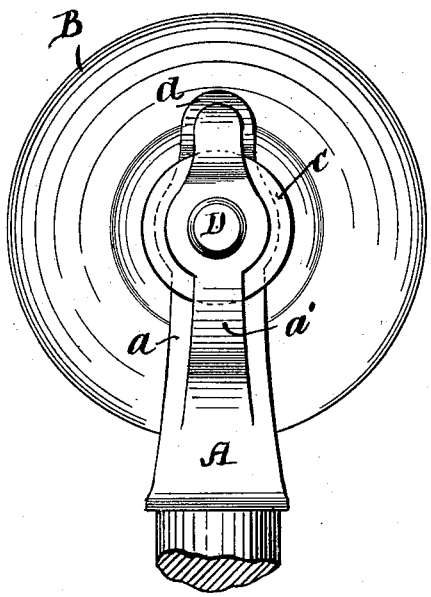

Referring to the accompanying drawings, Figure 1 represents an end view of a trolley-wheel and head fitted with auxiliary contact wheels or rollers embodying my invention. Fig. 2 is a side view of same.

A represents a portion of the trolley-head, having two arms $a$ $a$, between which is mounted the main trolley-wheel B. From the outside of each of the arms $a$ extends a bracket $a'$, between which and the arms $a$ are mounted small contact wheels or rollers C C.

D is the axle or shaft that passes through bearings formed in the ends of the arms $a$ and brackets $a'$, and upon which axle or shaft the wheels B C C are mounted, so as to rotate freely. The upper ends of the arms $a$ extend up some distance above the periphery of the wheels or rollers C C and are curved toward the same, as shown, so that should the main trolley-wheel B jump from the wire or conductor the latter will not fall between the wheel B and one of the wheels or rollers C, but will by said upper end of the arm be conducted onto the roller C. The upper ends of the brackets $a'$ also extend some distance above the periphery of the wheels or rollers C, so that when same are once in contact with the wire or conductor they will not run or slip off same.

It will be seen that by this construction should the main trolley-wheel jump the electric wire or conductor the latter will be caught by one of the side contact wheels or rollers, so that the electric current will still be supplied to the car, thus preventing its stopping and interfering with travel, and when a suitable opportunity offers the conductor can replace the main wheel upon the wire or conductor. Thus much time, delay, interruption to travel, and inconvenience to passengers will be avoided.

What I claim is—

A trolley-head having two arms between which the main trolley-wheel is mounted and a bracket on each side between which and one of the arms is mounted a small contact wheel or roller substantially as and for the purpose set forth.

In testimony whereof I have signed my name to this specification, in the presence of two subscribing witnesses, on this 4th day of December, A. D. 1897.

HOSEA W. LIBBEY.

Witnesses:
CHAS. STEERE,
EDWIN PLANTA.